US012769502B2

(12) United States Patent
Sen et al.

(10) Patent No.: US 12,769,502 B2
(45) Date of Patent: Oct. 20, 2026

(54) SIGNALING FOR IMMERSIVE AUDIO RENDERING

(71) Applicant: Apple Inc., Cupertino, CA (US)

(72) Inventors: Dipanjan Sen, Dublin, CA (US); Moo Young Kim, San Diego, CA (US)

(73) Assignee: Apple Inc., Cupertino, CA (US)

(*) Notice: Subject to any disclaimer, the term of this patent is extended or adjusted under 35 U.S.C. 154(b) by 94 days.

(21) Appl. No.: 18/777,083

(22) Filed: Jul. 18, 2024

(65) Prior Publication Data

US 2025/0377852 A1 Dec. 11, 2025

Related U.S. Application Data

(60) Provisional application No. 63/656,316, filed on Jun. 5, 2024.

(51) Int. Cl.
*G06F 3/16* (2006.01)
*H04S 3/00* (2006.01)

(52) U.S. Cl.
CPC .............. *G06F 3/162* (2013.01); *G06F 3/165* (2013.01); *H04S 3/008* (2013.01); *H04S 2420/01* (2013.01); *H04S 2420/11* (2013.01)

(58) Field of Classification Search
CPC .......... G06F 3/162; G06F 3/165; H04S 3/008; H04S 2420/01; H04S 2420/11
USPC .......................................... 381/17, 1, 61, 63
See application file for complete search history.

(56) References Cited

U.S. PATENT DOCUMENTS

| | | | |
|---|---|---|---|
| 12,400,101 B1 * | 8/2025 | Cosic | G06N 5/022 |
| 2012/0232910 A1 | 9/2012 | Dressler et al. | |
| 2014/0226823 A1 | 8/2014 | Sen et al. | |
| 2015/0264484 A1 | 9/2015 | Peters et al. | |
| 2015/0332683 A1 | 11/2015 | Kim et al. | |
| 2019/0387348 A1 | 12/2019 | Peters et al. | |
| 2020/0105282 A1 | 4/2020 | Kim et al. | |
| 2020/0265853 A1 | 8/2020 | Hatanaka et al. | |

(Continued)

OTHER PUBLICATIONS

ITU, "Audio Definition Model", received from https://www.itu.int/dms_pubrec/itu-r/rec/bs/R-REC-BS.2076-2-201910-1 !!PDF-E.pdf, ITU-R Radiocommunication Sector of ITU Recommendation ITU-R BS.2076-2, Oct. 2019, including excerpt with cover and pp. ii, 1, 1-10, 44, and 53-57 provided.

(Continued)

*Primary Examiner* — Thjuan K Addy
(74) *Attorney, Agent, or Firm* — Aikin & Gallant, LLP

(57) ABSTRACT

A system may utilize a signaling method to enable immersive audio rendering by a player. The system may package, in one or more bitstreams, audio content generated by a content creation tool for input to a type of audio renderer, selected from a plurality of types of audio renderers, a selected sub-type of the type of audio renderer, and a version of the selected sub-type of audio renderer. The one or more bitstreams may indicate start and end channel indexes in which the selected type, sub-type, and version are effective. The one or more bitstreams may be provided for transmission to a player. The one or more bitstreams may configure the player to utilize an audio renderer, for playback of the audio content in a playback environment, of the selected sub-type and the version indicated in the one or more bitstreams. Other aspects are also described and claimed.

20 Claims, 7 Drawing Sheets

(56) References Cited

U.S. PATENT DOCUMENTS

| | | | |
|---|---|---|---|
| 2021/0118452 | A1 | 4/2021 | Tsingos et al. |
| 2024/0282320 | A1 | 8/2024 | Munoz |

OTHER PUBLICATIONS

EBU ADM "EBU ADM Guidelines-Rendering", received from https://adm.ebu.io/background/rendering.html, 2021, 2 pages.

* cited by examiner

120

SARC Configuration Table 0

| Verification Code | Size in Bytes | SARC ID | Data ID | Transmission path | Fallback ID |
|---|---|---|---|---|---|
| V0 (128 bits) | S0 (32bits) | 0 | 0 (HOA rendering matrix) | S3 | 4 |

122

SARC Configuration Table 1

| Verification Code | Size in Bytes | SARC ID | Data ID | Transmission path | Fallback ID |
|---|---|---|---|---|---|
| V1 (128 bits) | S1 (32bits) | 1 | 0 (radiation pattern A) | S4 | 2 |
| | | | 1 (radiation pattern B) | S4 | 7 |
| | | | 2 (radiation pattern C) | S4 | 1 |

FIG. 2

124

| SARC Mapping Table | | | |
|---|---|---|---|
| ASC ID | ASC Type | Mapping to SARC | |
| | | SARC ID | Data ID |
| 0 | OBJ | 1 | 2 |
| 1 | HOA | 0 | 0 |

FIG. 3

126

| Syntax | NoOfBits |
|---|---|
| SARCBitstream() { | |
| **verificationCode**; | 128 |
| **sarcSizeInBytes** | 32 |
| for (i=0; i< sarcSizeInBytes; i++) | |
| **sarcData[i]**; | 8 |
| } | |

FIG. 4

SIGNALING FOR IMMERSIVE AUDIO RENDERING

RELATED APPLICATIONS

This patent application claims the benefit of priority of U.S. Provisional Application No. 63/656,316, filed Jun. 5, 2024, which is incorporated herein by reference in its entirety.

BACKGROUND

Field

This disclosure relates generally to audio systems and, more specifically, to signaling for immersive audio rendering by a player. Other aspects are also described.

Background Information

A player can utilize an audio decoder and an audio renderer to play back audio content in a playback environment. The playback environment may include, for example, speakers utilizing channels having various layouts, such as a 5.1 or 7.1 audio channel format or headphones. The player can utilize the decoder to decode a bitstream including audio content encoded by a content creation tool. The player can then utilize the renderer to render the audio content, from the decoded bitstream, in the playback environment.

The player can utilize different types of audio renderers for the playback. For example, the player could utilize a channel-based (CH) audio renderer, an object-based (OBJ) audio renderer, or a higher order ambisonics (HOA) based audio renderer. Each type of audio renderer may have a specific configuration known to the player.

SUMMARY

Implementations of this disclosure include utilizing a content creation tool to package a sub-type and version of audio renderer to be used by a player, and/or supplemental audio rendering configuration (SARC) data to be used by the player, to enhance immersive audio rendering by the player. This may enable the player to produce sound in a playback environment for a user with fine tuning and/or artistic intent.

Some implementations may include packaging, in one or more bitstreams, i) audio content generated by a content creation tool for input to a type of audio renderer, selected from a plurality of types of audio renderers, ii) a selected sub-type of the type of audio renderer, and iii) a version of the selected sub-type of audio renderer. The one or more bitstreams may be provided for transmission to a player. The one or more bitstreams may indicate a start channel index and an end channel index in which the selected type, sub-type, and version are effective. The one or more bitstreams may configure the player to utilize an audio renderer, for playback of the audio content in a playback environment, of the selected sub-type and the version signaled in the one or more bitstreams. In some cases, the signaling method may include packaging in the one or more bitstreams SARC data to enhance immersive audio rendering by the player.

Some implementations may include packaging, in one or more bitstreams, i) audio content generated by a content creation tool for input to an audio renderer, ii) SARC configuration data corresponding to the audio content, the SARC configuration data including a SARC configuration table and a SARC mapping table to initialize the audio renderer, and iii) a SARC payload to be used by the audio renderer to enhance the immersive audio rendering. The one or more bitstreams may be provided for transmission to a player. The one or more bitstreams may configure the player to utilize the SARC configuration data and the SARC payload for playback of the audio content in a playback environment. Other aspects are also described and claimed.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 2 is an example of SARC configuration tables.

FIG. 3 is an example of a SARC mapping table.

FIG. 4 is an example of a SARC payload.

DETAILED DESCRIPTION

Figure 1:
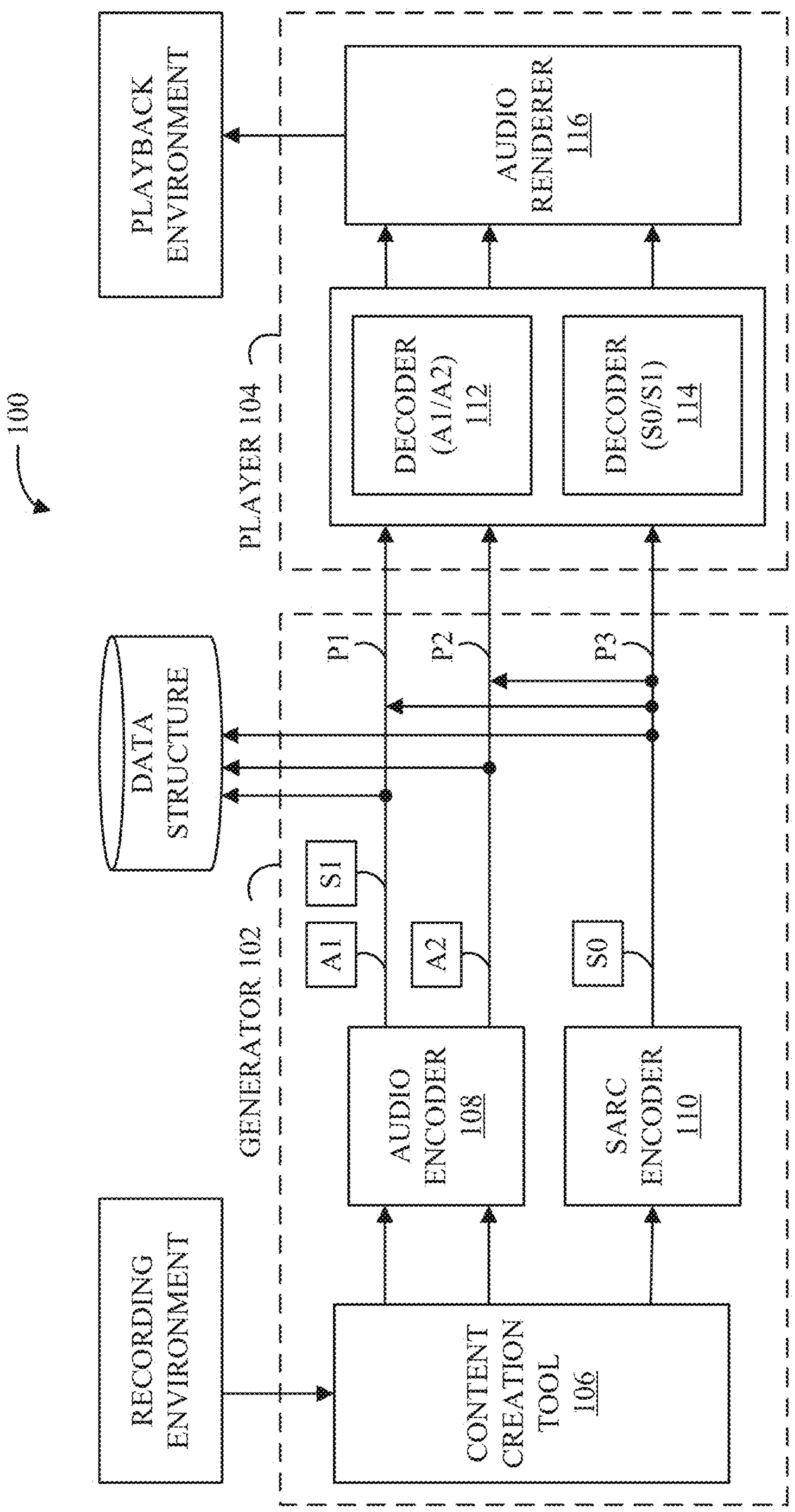
FIG. 1 is an example of a workflow for immersive audio rendering.

A system can receive input audio generated in a recording environment having one or more microphones. The system can utilize a content creation tool and encoder to package, in one or more bitstreams, audio content based on data from the recording environment. The system can then transmit the bitstreams to a player for playback in an environment having one or more speakers or headphones (or transmit to a data structure for storage and later use by one or more players).

However, the player receiving the bitstreams may utilize an audio renderer that may change, in the playback environment, sound from the recording environment as may be experienced by a user. Further, the audio renderer may be limited in the audio configuration data that it may utilize based on the timing requirements for receiving the configuration data in time for playback of audio content. These aspects may result in a loss of artistic intent of the audio content in the playback environment.

Implementations of this disclosure address problems such as these by utilizing a content creation tool to package a sub-type and version of audio renderer to be used by a player, and/or SARC data to be used by the player, to enhance immersive audio rendering by the player. This may enable the player to produce sound in the playback environment for a user with fine tuning and/or artistic intent.

In some implementations, a system may package, in one or more bitstreams, i) audio content generated by a content creation tool for input to a type of audio renderer, selected from a plurality of types of audio renderers, ii) a selected sub-type of the type of audio renderer, and iii) a version of the selected sub-type of audio renderer. The one or more bitstreams may indicate a start channel index and an end channel index in which the selected type, sub-type, and version are effective. The system may provide the one or more bitstreams for transmission to a player. The one or more bitstreams may configure the player to utilize an audio renderer, for playback of the audio content in a playback environment, of the selected sub-type and the version signaled in the one or more bitstreams.

In some implementations, a system may package, in one or more bitstreams, i) audio content generated by a content creation tool for input to an audio renderer, ii) SARC configuration data corresponding to the audio content, the SARC configuration data including a SARC configuration table and a SARC mapping table to initialize the audio renderer, and iii) a SARC payload to be used by the audio renderer to enhance the immersive audio rendering. The system may provide the one or more bitstreams to be transmitted to a player. The one or more bitstreams may configure the player to utilize the SARC configuration data and the SARC payload for playback of the audio content in a playback environment.

Thus, implementations may include transmitting not only audio content for audio rendering, but also a renderer type, sub-type, and to enhance immersive audio rendering. Implementations may also include transmitting SARC data to a player to enhance immersive audio rendering. As a result, a player can produce sound in a playback environment in a manner that maintains artistic intent.

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

In some implementations, for immersive audio rendering, to preserve artistic intent, the bitstream syntax may indicate which audio renderer to use for an input audio type, such as a channel-based, object-based, HOA-based, or mixed content. If a specific type of audio renderer is unavailable, a bitstream may indicate that a default audio renderer can then be used by the player. In some cases, a bitstream may indicate that channel-based contents are to be converted to objects or HOA followed by object or HOA rendering, respectively. If channel-based contents are to be converted to objects, the bitstream can signal which object renderer to use following the conversion or enable a default object renderer to be used by the player. If channel-based contents are to be converted to HOA, the bitstream can signal which HOA renderer to use following the conversion or enable a default HOA renderer to be used by the player. In some cases, a bitstream may indicate that object-based contents are to be converted to HOA followed by HOA rendering. If object-based contents are to be converted to HOA, the bitstream can signal which HOA renderer to use following the conversion or enable a default HOA renderer to be used by the player. In some cases, a bitstream may indicate that HOA-based contents are to be converted to channels followed by channel rendering. If HOA-based contents are to be converted to channels, the bitstream can signal which channel renderer to use following the conversion or enable a default channel renderer to be used by the player. Further, the bitstream can signal audio renderer versions for channel, object, and HOA renderers. In some cases, a signaled renderer might not be available. In such cases, a default renderer (or preferred renderer) could be used by the player. For this purpose, a default renderer for each input type may be set at the renderer side in advance.

FIG. 1 is an example of a workflow 100 for immersive audio rendering. The workflow 100 may include a sending system and a receiving system, such as a generator 102 and a player 104, respectively. The workflow 100 may also include a data structure for storage. The generator 102 may include a content creation tool 106, an audio encoder 108, and/or a SARC encoder 110. The player 104 may include a decoding system, including a decoder 112 and/or a SARC decoder 114, and an audio renderer 116.

The content creation tool 106 can receive input audio generated from sound captured in a recording environment by utilizing one or more microphones. For example, the input audio may correspond to a song from an album played by an artist. The sound, when experienced by a user in the recording environment, may capture an artistic intent of the content creator. The generator 102 can then utilize the content creation tool 106 to generate audio data based on the sound, including configuration data Al and frame-by-frame data A2 (audio content).

The configuration data A1 may include, for example, bit rate, number of channels, audio type (e.g., channel-based, object-based, or HOA based audio renderer), flags, etc., to configure an audio codec of a player (e.g., decoder 112 and/or SARC decoder 114). The configuration data A1 may include, for example, audio channel layout, audio renderer type, etc., to configure an audio renderer of a player (e.g., audio renderer 116). The configuration data A1, generated by the content creation tool 106, may be packaged in an audio-coding configuration bitstream P1 (e.g., a bitstream for transmitting configuration data in an audio coding workflow) by the audio encoder 108. The configuration data Al may then be provided by the generator 102 to be transmitted to the player 104 or to the data structure. The configuration data A1 may be used to initialize the player 104 to generate an output signal for playback of the audio content in a playback environment by utilizing one or more speakers or headphones.

The frame-by-frame data A2 may include, for example, frame-by-frame gain, modified discrete cosine transform (MDCT) coefficients, window types, etc., for audio coding, e.g., to configure the audio codec of the player 104, and/or a frame-by-frame object gain, position, etc. for rendering, e.g., to configure the audio renderer of the player (e.g., audio renderer 116). The frame-by-frame data A2, generated by the content creation tool 106, may be packaged in a frame-by-frame data bitstream P2 (e.g., a bitstream for transmitting frame-by-frame data in the audio coding workflow) by the audio encoder 108. The frame-by-frame data A2 may then be provided by the generator 102 to be transmitted to the player 104 or the data structure. The frame-by-frame data A2 may be used by the player 104 in each frame of playback of the audio content in the playback environment.

In generating the audio content, the content creation tool 106 can select a type of audio renderer to target from a plurality of types of audio renderers available. For example, the content creation tool 106 could target a channel-based audio renderer, an object-based audio renderer, or an HOA-based audio renderer as different types for playback. The selected type may then be signaled by the generator 102 in the bitstream that is packaged for the player 104 to then utilize (e.g., signaled via "type" bits in a field of the bitstream). The content creation tool 106 can also select a sub-type of audio renderer, and version of the selected sub-type of audio renderer, which is targeted. The selected sub-type may define audio rendering details that are specific to the type of audio renderer. The version may include, for example, a first set of bits (e.g., an initial 16 bits in a version field) indicating a major version of the selected sub-type and a second set of bits (e.g., a remaining 16 bits in the version field) indicating a minor version of the selected sub-type. The selected sub-type and version may also be signaled by the generator 102 in the bitstream that is packaged for the player 104 to utilize (e.g., signaled via "sub-type" bits and "version" bits in different fields of the bitstream).

Further, the content creation tool 106 can select an audio renderer description syntax version (n bits) to be used by a renderer of the player (e.g., audio renderer 116). Depending on the syntax version, the bitstream structures could be different, and this may be signaled by the generator 102 in the bitstream to the renderer for determining a correct rendering based on the type, sub-type, and/or version (e.g., signaled via "syntax" bits in a field of the bitstream).

In a first example, the content creation tool 106 could select a channel-based audio renderer to be targeted. The content creation tool 106 could then select a sub-type for the channel-based renderer that specifies, for example, channels are played out based on an output speaker layout (e.g., a 7.1+4H audio channel format played as presented, or down mixed to the output speaker layout); channels are considered as objects (e.g., a 7.0+4H audio channel format processed as 11 pulse-code modulation (PCM) channels with static metadata that describes 7.0+4H speaker locations) and rendered with default object renderer; and/or channels converted to HOA and rendered with a default HOA-based audio renderer. The content creation tool 106 could select a version of the sub-type for the channel-based renderer, and description syntax version for the decoding.

In a second example, the content creation tool 106 could select an object-based audio renderer to be targeted. The content creation tool 106 could then select a sub-type for the object-based renderer that specifies, for example, a vector base amplitude panning (VBAP) or head-related transfer function (HRTF) renderer (e.g., a speaker or headphone renderer will be selected by the type of audio renderer, such as external speakers, built-in speakers, or headphones); objects are converted into HOA and rendered with default HOA audio renderer; and/or a vendor specific audio rendering configuration (e.g., a particular entity's configuration of an object-based audio renderer). The content creation tool 106 could also select a version of the sub-type for the object-based renderer, and description syntax version for the decoding.

In a third example, the content creation tool 106 could select an HOA-based audio renderer to be targeted. The content creation tool 106 could then select a sub-type for the HOA-based renderer that specifies, for example, a VBAP or HRTF renderer; parametric decoding to be used by a renderer; a transmitted HOA rendering matrix for an arbitrary speaker layout; HOA coefficients to be rendered to a pre-defined channel layout (e.g., a 7.0+4H audio channel format) using a transmitted HOA to channel conversion matrix; and/or an HOA renderer. The content creation tool 106 could also select a version of the sub-type for the HOA-based renderer, and description syntax version for the decoding.

Thus, different audio renderers may be signaled by the generator 102 in one or more bitstreams based on the processing performed by the content creation tool 106. For example, the content creation tool 106 can generate the configuration data A1 and frame-by-frame data A2 for input specifically to a selected type, sub-type, and/or version of audio renderer based on the audio renderer that was targeted. The generator 102 can utilize the audio encoder 108 to package, in one or more bitstreams, the audio content, selected type, sub-type, version, and/or description syntax version. The bitstreams may include indications of the description syntax version, and indications of the selected type, sub-type, and version, signaled to the audio renderer 116. The player 104 can use the signaled information to generate the output audio to play back the audio content in the playback environment consistently with sound in the recording environment (e.g., maintaining artistic intent).

The generator 102 can specify in the one or more bitstreams a start channel index and an end channel index in which a selected type, sub-type, and/or version of audio renderer may be effective. In some implementations, the generator 102 can specify in the one or more bitstreams a plurality of selected types, sub-types, and/or versions. Each selected type, sub-type, and/or version may correspond to a start channel index and an end channel index in which the selected type, sub-type, and/or version is effective (e.g., for playing audio content, assigned to the one or more audio channels). For example, there may be a set of channels (e.g., 50), a first group of which (e.g., channels 1-4) could use a sub-type and version of an HOA renderer, a second group of which (e.g., channels 5-16) could use a sub-type and version of the multi-channel renderer, and a third group of which (e.g., channels 17-50) could use a sub-type and version of the object renderer. As a result, different groups of channels may use different audio rendering types, sub-types, and/or versions in the same system.

In some implementations, the player 104 may be configured to utilize a default audio renderer (e.g., for the audio renderer 116) based on the selected type, sub-type, and/or version when the type, sub-type, or version is unavailable. For example, if the signaled audio renderer is unavailable, the player 104 could select a default (or preferred) renderer to use. A default audio renderer for each input type may be set by the player 104 in advance.

The generator 102 can also utilize the content creation tool 106 to generate SARC data. The SARC data may include large-sized, bulk data to enhance immersive audio rendering in the playback environment. For example, the SARC data may enable configuring radiation patterns of objects to enhance parallax in the playback environment, such as (number of azimuth directions)×(number of elevation directions)×(filter lengths)×(bit depth in bytes) (e.g. 360×180×1024×4=265 Mbytes). In another example, the SARC data may enable configuring an HOA rendering matrix in the playback environment. The player 104 can utilize the audio renderer 116 to process the SARC data to enhance the immersive audio rendering. The SARC data may comprise, for example, SARC configuration data S1 and a SARC payload S0.

The SARC configuration data S1 may include limited data to initialize the audio renderer 116, such as i) a SARC configuration table, and ii) a SARC mapping table. For example, with additional reference to FIGS. 2 and 3, the SARC configuration data S1 may include SARC configuration tables 120 and 122 (FIG. 2) and SARC mapping table 124 (FIG. 3). The SARC configuration tables 120 and 122 may each include one or more SARC identifiers ("SARC ID"). For example, each set of SARC data may have its own SARC identifier. Each SARC identifier in a configuration table may be linked to one or more data identifiers ("Data ID"). Each data identifier may specify one or more sets of audio rendering data in a SARC payload S0. The SARC configuration tables 120 and 122 may also indicate transmission paths, corresponding to data identifiers for the SARC payload ("Transmission Path") which could indicate possible bitstreams for transmission, such as paths P1, P2, or P3 shown in FIG. 1.

The SARC configuration tables 120 and 122 may also indicate fallback identifiers ("Fallback ID"), corresponding to data identifiers, to enable the player 104 to utilize a fallback solution from a codebook. For example, the SARC configuration data S1 may be available to the audio renderer 116 before the SARC payload S0 is available to the audio renderer 116 (e.g., the SARC configuration data S1 may be transmitted in its entirety before the SARC payload S0 is transmitted in its entirety). In this case, the audio renderer 116 can use a fallback solution specified in the SARC configuration data S1 to generate output audio and avoid stalling.

Further, the audio renderer 116 can crossfade between audio generated by the fallback solution and audio generated by the SARC payload S0 when the SARC payload S0 is later received. For example, before receiving the entire portion of the SARC payload S0, the audio renderer 116 can use one or more fallback solutions that are transmitted through the SARC configuration data S1. After receiving the entire portion of the SARC payload S0, the audio renderer 116 can fade out the audio output of fallback solutions and fade in the audio output of the SARC payload S0.

The SARC configuration tables 120 and 122 may also indicate a verification code and/or size of the SARC data, corresponding to SARC identifiers. For example, the player 104 may use the verification code for validation of the SARC data and may use the size to allocate memory for the SARC data.

The SARC mapping table 124 may link one or more SARC identifiers ("SARC ID") and data identifiers ("Data ID") in the SARC configuration tables 120 and 122 to audio scene component (ASC) identifiers ("ASC ID") associated with a set of audio channels. For example, the SARC mapping table 124 may associate SARC data, such as SARC ID 1 and Data ID 2 (e.g., radiation pattern C), with audio data, such as ASC ID 0 (e.g., an object audio signal). The SARC mapping table 124 may indicate an ASC type corresponding to SARC identifiers (e.g., CH, OBJ, or HOA, referring to channel-based, object-based, or HOA-based audio renderer, respectively).

The SARC configuration data S1 (e.g., the SARC configuration and mapping tables), generated by the content creation tool 106, may be packaged in the audio-coding configuration bitstream P1 by the audio encoder 108, with the configuration data A1. The SARC configuration data S1 may be provided by the generator 102 to be transmitted to the player 104 or the data structure. The SARC configuration data S1 may be used to initialize the player 104 to enhance immersive audio rendering in the playback environment.

The SARC payload S0 may include large-sized, bulk data to be used by the audio renderer 116 to enhance immersive audio rendering. For example, with additional reference to FIG. 4, an example SARC payload 126 is shown. The SARC payload 126 may include a verification code, size, and large-sized, bulk data (e.g., radiation patterns of objects, HOA rendering matrices, etc.). The SARC payload S0, generated by the content creation tool 106, may be packaged in a bitstream selected by SARC encoder 110, such as in the audio-coding configuration bitstream P1 or the frame-by-frame data bitstream P2 in the audio coding workflow ("in-band"), or a supplemental bitstream P3 in an independent SARC transmission workflow ("out-of-band"). The SARC payload S0 may be provided by the generator 102 to be transmitted to the player 104 or the data structure. The SARC payload S0 may be used by the player 104 in each frame of playback to enhance immersive audio rendering in the playback environment. While the decoder 112 can decode the configuration data A1 and the frame-by-frame data A2, the SARC decoder 114 can decode the SARC payload S0 and the SARC configuration data S1. Also, while the configuration data A1 and the frame-by-frame data A2 can be transmitted via packets utilizing paths P1 and P2, respectively, the SARC configuration data S1 can be transmitted via packets utilizing path P1, and the SARC payload S0 can be transmitted via packets utilizing any of paths P1, P2, or P3.

The SARC payload S0 may be large (e.g., larger than S1), taking some time before the audio renderer 116 receives the entire portion of the SARC payload S0. Also, the SARC configuration data S1 may be small (e.g., smaller than S0), and the audio renderer 116 may receive the SARC configuration data S1 before receiving the SARC payload S0. The generator 102 can select the transmission path for the SARC payload S0 to be transmitted to the audio renderer 116 (e.g., in-band via P1 or P2, or out-of-band via P3) and indicate the selection in the SARC configuration data S1 (e.g., SARC configuration table 120 or 122) transmitted through the audio-coding configuration bitstream P1 that the player 104 is already configured to receive. Further, the generator 102 can select the timing of transmission of the SARC payload S0, such as a one-time "pulse" of the SARC payload S0 or gradual "build-up" of the SARC payload S0 to the player 104.

Figure 5:
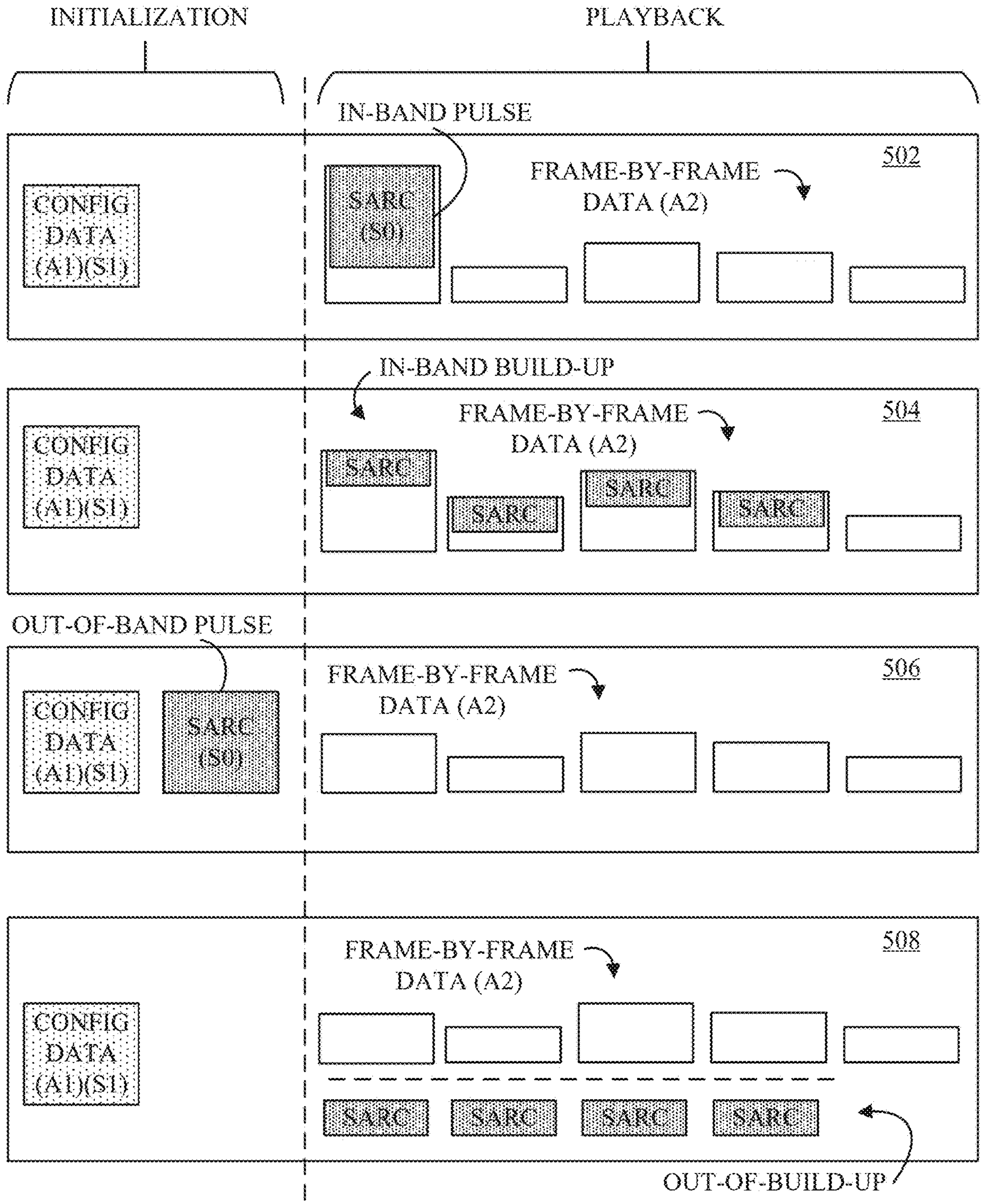
FIG. 5 illustrates examples of transmitting a SARC payload.

For example, with additional reference to transmission 502 of FIG. 5, the generator 102 may select the configuration data A1, the SARC configuration data S1, and the SARC payload S0 to be packaged in the audio-coding configuration bitstream P1; and the frame-by-frame data A2 to be packaged in the frame-by-frame data bitstream P2. This selection may simplify transmissions to the audio coding workflow (e.g., does not utilize the SARC transmission workflow). The generator 102 can transmit a one-time pulse of the SARC payload S0, via the audio-coding configuration bitstream P1 (after configuration data A1 is transmitted for initialization of the player), while transmitting a frame of the frame-by-frame data A2 in the frame-by-frame data bitstream P2 (e.g., audio content). Thus, the SARC payload S0 may be transmitted in-band with the audio content, in a same bitstream, and pulsed in its entirety during an initial frame of the playback sequence. In some cases, the SARC payload S0 may be transmitted in-band with the configuration data (e.g., after transmission of the configuration data, utilizing audio-coding configuration bitstream P1).

In another example, with reference to transmission 504, the generator 102 may select the configuration data A1 and the SARC configuration data S1 to be packaged in the audio-coding configuration bitstream P1; and the frame-by-frame data A2 and the SARC payload S0 to be packaged in the frame-by-frame data bitstream P2. This selection also simplifies transmissions to the audio coding workflow (e.g., does not utilize the SARC transmission workflow). The generator 102 can transmit a build-up of the SARC payload S0, via the frame-by-frame data bitstream P2, while transmitting frames of the frame-by-frame data A2. Thus, the SARC payload S0 may be transmitted in-band and sent in portions during frames of the playback sequence until sent in its entirety. This may result in a reduction of peak bandwidth utilized by the frame-by-frame data bitstream P2.

In a further example, with reference to transmission 506, the generator 102 may select the audio configuration data Al and the SARC configuration data S1 to be packaged together in the audio-coding configuration bitstream P1; the frame-by-frame data A2 to be packaged in the frame-by-frame data bitstream P2; and the SARC payload S0 to be packaged in the supplemental bitstream P3. This selection may utilize both the audio coding workflow and the SARC transmission workflow. With the SARC payload S0 packaged in the supplemental bitstream P3, the SARC payload S0 may be transmitted directly to the audio renderer 116 for decoding by the SARC decoder 114 (e.g., without using the decoder 112). The generator 102 can transmit a one-time pulse of the SARC payload S0, via the supplemental bitstream P3, during initialization of the player 104, before transmission of the frame-by-frame data A2 (e.g., the playback sequence including the audio content). Thus, the SARC payload S0 may be transmitted out-of-band, in a different bit stream, relative to transmission of configuration data, and may be pulsed in its entirety during initialization, before the playback sequence begins. In a variation, with reference to transmission 508, the generator 102 can transmit a build-up of the SARC payload S0, via the supplemental bitstream P3, while transmitting frames of the frame-by-frame data A2. Thus, the SARC payload S0 may be transmitted out-of-band, in a different bit stream, relative to transmission of audio content, and may be sent in portions during frames of the playback sequence until sent in its entirety. This may result in a reduction of peak bandwidth utilized by the frame-by-frame data bitstream P2.

Figure 6:
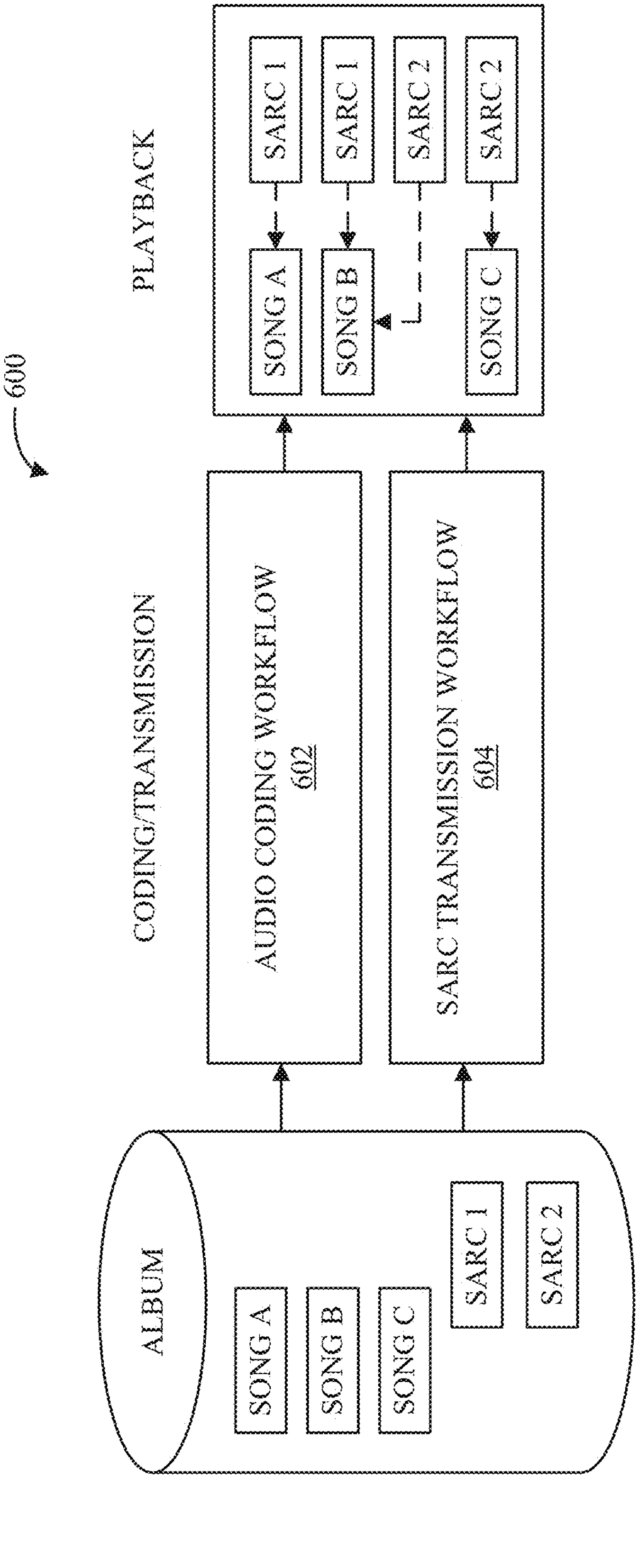
FIG. 6 is another example of a workflow for immersive audio rendering.

FIG. 6 is an example of a workflow 600 for immersive audio rendering. The workflow 600 may include an audio coding workflow 602 and an independent SARC transmission workflow 604 (in parallel with one another when present) for coding and transmission. The generator 102 can utilize the content creation tool 106 to produce an album including one or more songs based on input audio from the recording environment. The content creation tool 106 can generate audio content in connection with each song, such as configuration data A1 and frame-by-frame data A2 for songs A, B, and C. The audio content can be generated by the content creation tool 106 for input to a type of audio renderer being targeted, such as a channel-based, object-based, or HOA based audio renderer. Further, the audio content can be generated by the content creation tool 106 for a specific sub-type and version of the type of audio renderer. The content creation tool 106 can also generate SARC data in connection with songs A, B, and C. The SARC data may include SARC configuration data S1 (e.g., SARC configuration and mapping tables) and SARC payload S0, corresponding to the songs A, B, and C. Further, as generated, certain SARC data may be used multiple times for different songs of the album. For example, SARC 1 may be used for Song A, SARC 1 and SARC 2 may both be used for Song B, and SARC 2 may again be used for Song C.

The generator 102 can utilize the audio encoder 108 and/or the SARC encoder 110 to package, in one or more bitstreams, the audio content, including the configuration data A1, the frame-by-frame data A2, and the SARC data (e.g., SARC 1 and SARC 2). The generator 102 can transmit the foregoing information to the player 104 in the one or more bitstreams, along with the selected type of audio renderer, the selected sub-type, and the selected version. The generator 102 can utilize the audio coding workflow 602 and/or the SARC transmission workflow 604 to transmit the foregoing information. For example, the generator 102 can utilize audio-coding configuration bitstream P1 and/or frame-by-frame data bitstream P2 of audio coding workflow 602, and/or utilize the supplemental bitstream P3 of SARC transmission workflow 604, to signal the foregoing information, including the audio content (e.g., Songs A, B, and C), type, sub-type, version, and/or SARC data (e.g., SARC 1 and SARC 2).

The player 104 can utilize the foregoing information to select a type, sub-type, and/or version of the audio renderer 116, and produce output audio in the playback environment with enhanced immersive audio rendering based on the selection and the SARC data, including using certain SARC data multiple times for different songs to avoid re-transmissions. For example, the player 104 can play song A utilizing SARC 1, then song B utilizing SARC 1 again and utilizing SARC 2, then play song C utilizing SARC 2 again. The SARC data can be transmitted once by the generator 102, then stored locally and referenced multiple times for different songs by the player 104.

Figure 7:
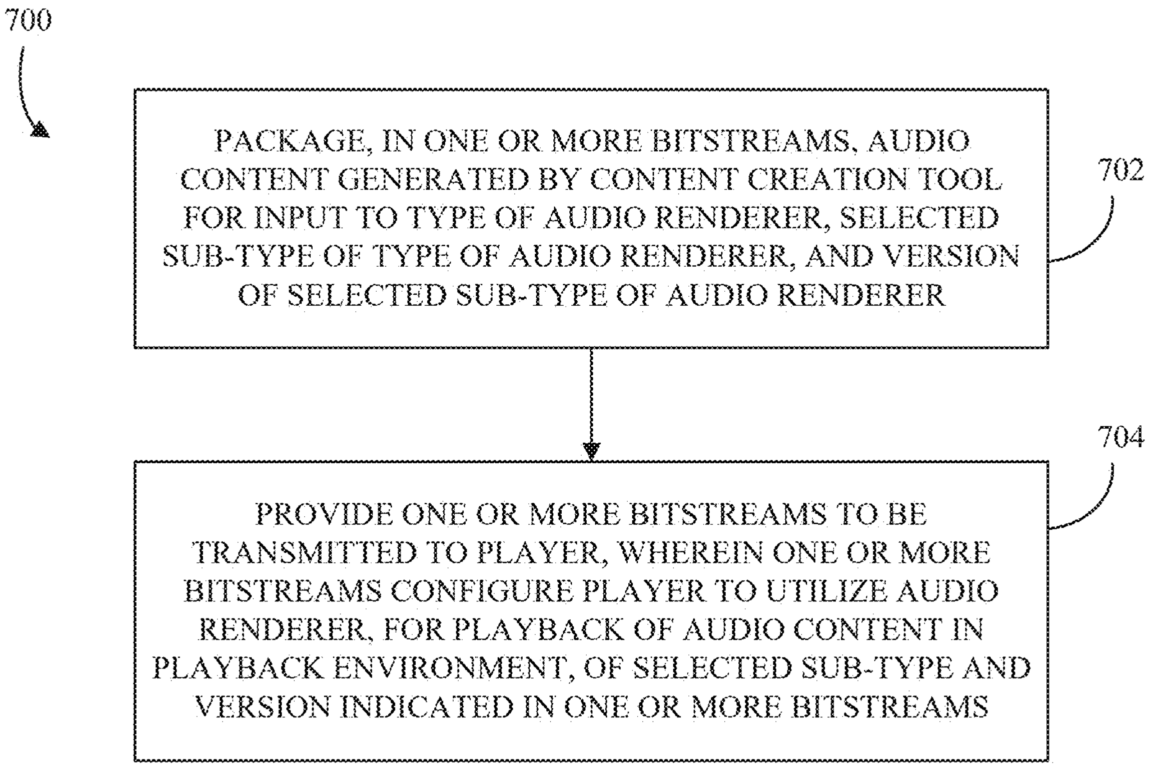
FIG. 7 is a flowchart of an example of a process for immersive audio rendering based on packaging a sub-type and version of audio renderer.

FIG. 7 is a flowchart of an example of a process 700 for immersive audio rendering based on packaging a sub-type and version of audio renderer. The process 700 can be executed using computing devices, such as the systems, hardware, and software described with respect to FIGS. 1-6. The process 700 can be performed, for example, by executing a machine-readable program or other computer-executable instructions, such as routines, instructions, programs, or other code. The steps, or operations, of the process 700 or another process, method, technique, or algorithm described in connection with the implementations disclosed herein can be implemented directly in hardware, firmware, software executed by hardware, circuitry, or a combination thereof.

For simplicity of explanation, the process 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a process in accordance with the disclosed subject matter.

At operation 702, a system may package, in one or more bitstreams, audio content generated by a content creation tool for input to a type of audio renderer, selected from a plurality of types of audio renderers; a selected sub-type of the type of audio renderer; and a version of the selected sub-type of audio renderer. The one or more bitstreams, as generated by the content creation tool, may indicate a start channel index and an end channel index in which the selected type, sub-type, and version are effective. For example, a sending system, such as the generator 102, may package in one or more bitstreams audio content generated by the content creation tool 106 for input to a type of audio renderer, such as configuration data A1, frame-by-frame data A2, and/or SARC data. The type of audio renderer selected could be, for example, a channel-based, object-based, or HOA based audio renderer. The sending system can further package in the one or more bitstreams a selected sub-type of the type of audio renderer and a version of the selected sub-type, contained in bitfields of the bitstreams along with audio content and/or SARC data. The sending system could utilize bitstreams in different workflows to signal the information, such as the audio-coding configuration bitstream P1 and/or the frame-by-frame data bitstream P2 of the audio coding workflow, and/or the supplemental bitstream P3 of the SARC transmission workflow. The one or more bitstreams, as generated by the content creation tool 106, may indicate a start channel index and an end channel index in which the selected type, sub-type, and version are effective. For example, there may be a set of channels (e.g., 50), a first group of which (e.g., channels 1-4) could use a sub-type and version of an HOA renderer, a second group of which (e.g., channels 5-16) could use a sub-type and version of the multi-channel renderer, and a third group of which (e.g., channels 17-50) could use a sub-type and version of the object renderer. As a result, different groups of channels may use different audio rendering types, sub-types, and/or versions in the same system.

At operation 704, the system may provide the one or more bitstreams to be transmitted to a player. The one or more bitstreams may configure the player to utilize an audio renderer, for playback of the audio content in a playback environment, of the selected sub-type and the version signaled in the one or more bitstreams. For example, the sending system may provide the one or more bitstreams for the player 104 to utilize and/or a data structure to store. The player 104, when receiving the one or more bitstreams, can utilize the information contained therein to select an audio renderer of the selected type, sub-type, and/or version to play back the audio content in a playback environment with immersive audio rendering by the player 104.

Figure 8:
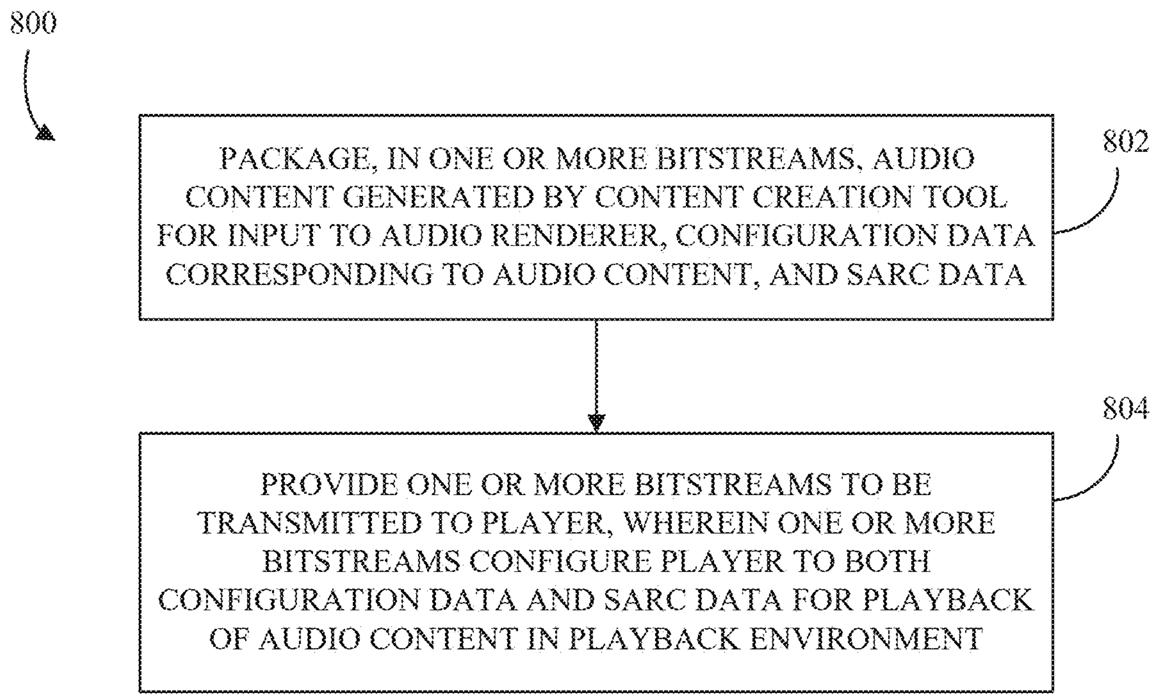
FIG. 8 is a flowchart of an example of a process for immersive audio rendering based on packaging SARC data.

FIG. 8 is a flowchart of an example of a process 800 for immersive audio rendering based on packaging SARC data. The process 800 can be executed using computing devices, such as the systems, hardware, and software described with respect to FIGS. 1-7. The process 800 can be performed, for example, by executing a machine-readable program or other computer-executable instructions, such as routines, instructions, programs, or other code. The steps, or operations, of the process 800 or another process, method, technique, or algorithm described in connection with the implementations disclosed herein can be implemented directly in hardware, firmware, software executed by hardware, circuitry, or a combination thereof.

For simplicity of explanation, the process 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a process in accordance with the disclosed subject matter.

At operation 802, a system may package, in one or more bitstreams, audio content generated by a content creation tool for input to an audio renderer; SARC configuration data corresponding to the audio content, the SARC configuration data including a SARC configuration table and a SARC mapping table to initialize the audio renderer; and a SARC payload to be used by the audio renderer to enhance the immersive audio rendering. For example, a sending system, such as the generator 102, may package, in one or more bitstreams, audio content generated by the content creation tool 106 for input to the audio renderer 116. The audio content may include configuration data A1 and frame-by-frame data A2. The generator 102 may package SARC data, such as SARC configuration data S1 corresponding to the audio content, and SARC payload S0, to be used by the audio renderer 116 to enhance the immersive audio rendering. The SARC configuration data may include, for example, SARC configuration tables 120 and 122 and a SARC mapping table 124 to initialize the audio renderer. The sending system could utilize bitstreams in different workflows to signal the information, such as the audio-coding configuration bitstream P1 and/or the frame-by-frame data bitstream P2 of the audio coding workflow, and/or the supplemental bitstream P3 of the SARC transmission workflow.

At operation 804, the system may provide the one or more bitstreams to be transmitted to a player. The one or more bitstreams may configure the player to utilize the SARC configuration data and the SARC payload for playback of the audio content in a playback environment. For example, the sending system may provide the one or more bitstreams for the player 104 to utilize and/or a data structure to store. The player 104, when receiving the one or more bitstreams, can utilize the SARC data contained therein to play back the audio content in a playback environment with immersive audio rendering by the player 104.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In utilizing the various aspects of the embodiments, it would become apparent to one skilled in the art that combinations or variations of the above embodiments are possible for immersive audio rendering. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A signaling method for immersive audio rendering by a player, comprising:

packaging, in one or more bitstreams, i) audio content generated by a content creation tool for input to a type of audio renderer, selected from a plurality of types of audio renderers, ii) a selected sub-type of the type of audio renderer, and iii) a version of the selected sub-type of audio renderer, wherein the one or more bitstreams indicate a start channel index and an end channel index in which the selected type, sub-type, and version are effective; and providing the one or more bitstreams to be transmitted to a player, wherein the one or more bitstreams configure the player to utilize an audio renderer, for playback of the audio content in a playback environment, of the selected sub-type and the version signaled in the one or more bitstreams.

2. The signaling method of claim 1, wherein the one or more bitstreams indicate a conversion from one type of audio renderer to another.

3. The signaling method of claim 1, wherein the one or more bitstreams enable a default audio renderer to be used by the player following a conversion from one type of audio renderer to another.

4. The signaling method of claim 1, wherein the type of audio renderer is selected from types of audio renderers that include i) a channel-based audio renderer, ii) an object-based audio renderer, and iii) a higher order ambisonics (HOA) based audio renderer.

5. The signaling method of claim 1, wherein the selected sub-type indicates that channels are considered as objects and rendered with a default object renderer or that objects are converted into HOA and rendered with a default HOA renderer.

6. The signaling method of claim 1, wherein the selected sub-type indicates that channels are played out based on an output speaker layout or a speaker or headphone renderer will be selected by the type of audio renderer.

7. The signaling method of claim 1, wherein the selected sub-type indicates a vendor specific audio rendering configuration for the type of audio renderer.

8. The signaling method of claim 1, wherein the version comprises a first set of bits indicating a major version of the selected sub-type and a second set of bits indicating a minor version of the selected sub-type.

9. The signaling method of claim 1, further comprising:

packaging, in the one or more bitstreams, an audio renderer description syntax version that enables a renderer of the player to determine a rendering based on the selected sub-type.

10. The signaling method of claim 1, wherein the player is configured to utilize a default audio renderer based on the selected sub-type when the selected sub-type is unavailable.

11. The signaling method of claim 1, further comprising:

packaging, in the one or more bitstreams, supplemental audio rendering configuration (SARC) data, including SARC configuration data and a SARC payload, to configure radiation patterns of objects or a higher order ambisonics (HOA) rendering matrix.

12. The signaling method of claim 1, wherein the one or more bitstreams indicate a selection between utilizing a default audio renderer or the audio renderer of the selected type, sub-type, and version.

13. The signaling method of claim 1, wherein the selected sub-type indicates parametric decoding to be used by the audio renderer.

14. The signaling method of claim 1, wherein the one or more bitstreams indicate a plurality of selected types, sub-types, and versions, each selected type, sub-type, and version corresponding to the start channel index and the end channel index in which the selected type, sub-type, and version is effective.

15. A system for enabling immersive audio rendering, comprising:

a memory; and a processor configured to execute instructions stored in the memory to:

receive input audio generated in a recording environment;

generate one or more bitstreams based on the input audio, the one or more bitstreams including i) audio content generated by a content creation tool for input to a type of audio renderer, selected from a plurality of types of audio renderers, ii) a selected sub-type of the type of audio renderer, and iii) a version of the selected sub-type of audio renderer, wherein the one or more bitstreams indicate a start channel index and an end channel index in which the selected type, sub-type, and version are effective; and transmit the one or more bitstreams to enable a player to utilize an audio renderer, for playback of the audio content in a playback environment, of the selected sub-type and the version signaled in the one or more bitstreams.

16. The system of claim 15, wherein the one or more bitstreams indicate a sub-type of audio renderer to use following a conversion from one type of audio renderer to another.

17. The system of claim 15, wherein the one or more bitstreams enable a default audio renderer to be used by the player when a specific type of audio renderer is unavailable.

18. The system of claim 15, wherein the type of audio renderer selected is a channel-based audio renderer, and wherein the selected sub-type indicates that channels are considered as objects and rendered with a default object renderer.

19. The system of claim 15, wherein the type of audio renderer selected is an object-based audio renderer, and wherein the selected sub-type indicates that objects are converted into HOA and rendered with a default HOA renderer.

20. The system of claim 15, wherein the type of audio renderer selected is an HOA based audio renderer, and wherein the selected sub-type indicates a vector base amplitude panning (VBAP) renderer or a head-related transfer function (HRTF) renderer.

* * * * *